US010380152B2

(12) United States Patent
Bufe, III et al.

(10) Patent No.: US 10,380,152 B2
(45) Date of Patent: Aug. 13, 2019

(54) COGNITIVE SYSTEM COMPARISON AND RECOMMENDATION ENGINE

(71) Applicant: International Business Machines Corporation, Armonk, NY (US)

(72) Inventors: John P. Bufe, III, Washington, DC (US); Donna K. Byron, Petersham, MA (US); Alexander Pikovsky, Lexington, MA (US); Timothy P. Winkler, Clinton, MA (US)

(73) Assignee: International Business Machines Corporation, Armonk, NY (US)

( * ) Notice: Subject to any disclaimer, the term of this patent is extended or adjusted under 35 U.S.C. 154(b) by 546 days.

(21) Appl. No.: 15/000,417

(22) Filed: Jan. 19, 2016

(65) Prior Publication Data

US 2017/0206270 A1 Jul. 20, 2017

(51) Int. Cl.
*G06F 17/30* (2006.01)
*G06F 16/33* (2019.01)
*G06F 16/9535* (2019.01)
*G06F 16/332* (2019.01)

(52) U.S. Cl.
CPC ........ *G06F 16/334* (2019.01); *G06F 16/3329* (2019.01); *G06F 16/9535* (2019.01)

(58) Field of Classification Search
CPC ...................................................... G06F 17/30
USPC ...................................................... 707/734
See application file for complete search history.

(56) References Cited

U.S. PATENT DOCUMENTS

| 8,959,043 | B2 | 2/2015 | Ferrucci et al. | |
|---|---|---|---|---|
| 2008/0253363 | A1* | 10/2008 | Altberg | G06Q 30/02 370/352 |
| 2009/0287678 | A1 | 11/2009 | Brown et al. | |
| 2011/0066587 | A1 | 3/2011 | Ferrucci et al. | |
| 2011/0112848 | A1* | 5/2011 | Beraja | G06F 19/324 705/2 |
| 2011/0125734 | A1 | 5/2011 | Duboue et al. | |
| 2013/0007055 | A1 | 1/2013 | Brown et al. | |
| 2013/0018652 | A1 | 1/2013 | Ferrucci et al. | |
| 2013/0066886 | A1 | 3/2013 | Bagchi et al. | |

(Continued)

OTHER PUBLICATIONS

Chu-Carroll, Jennifer et al., "In Question Answering, Two Heads Are Better Than One", Proceedings of HLT-NAACL 2003 Main Papers, http://www.aclweb.org/anthology/N03-1004, May-Jun. 2003, pp. 24-31.

(Continued)

*Primary Examiner* — Kim T Nguyen
(74) *Attorney, Agent, or Firm* — Stephen J. Walder, Jr.; Diana R. Gerhardt

(57) ABSTRACT

Mechanisms are provided to implement a cognitive system collaboration identification and recommendation system (CSCIRS). The CSCIRS stores, in a cognitive system database, entries corresponding to a plurality of cognitive system instances. Each entry identifies operational characteristics of a corresponding cognitive system instance. The CSCIRS receives, from a requestor, a request to identify a potential collaborative cognitive system instance and identifies, based on the request and the cognitive system database, a candidate collaborative cognitive system instance. The CSCIRS generates a collaboration recommendation based on the identification and outputs an output corresponding to the collaboration recommendation.

19 Claims, 7 Drawing Sheets

(56) References Cited

U.S. PATENT DOCUMENTS

| | | |
|---|---|---|
| 2014/0114989 A1 | 4/2014 | Sotos |
| 2015/0356422 A1* | 12/2015 | Sanchez ............... G06F 16/287 |
| | | 706/12 |
| 2015/0356434 A1* | 12/2015 | Sanchez .................. G06N 5/04 |
| | | 706/12 |
| 2018/0134803 A1* | 5/2018 | Douthwaite ....... C07K 16/3015 |
| 2018/0250397 A1* | 9/2018 | Benyunes ........ A61K 39/39558 |
| 2018/0330194 A1* | 11/2018 | Peng .................... G06K 9/6256 |

OTHER PUBLICATIONS

High, Rob, "The Era of Cognitive Systems: An Inside Look at IBM Watson and How it Works", IBM Corporation, http://ip.com/pdf/redbook/REDP495500.pdf, Dec. 12, 2012, 16 pages.

McCord, M.C. et al., "Deep parsing in Watson", IBM J. Res. & Dev. vol. 56 No. 3/4 Paper 3, May/Jul. 2012, pp. 3:1-3:15.

Wu, Dan et al., "Comparing IPL2 and Yahoo! Answers: A Case Study of Digital Reference and Community Based Question Answering", Proceedings of the 2014 iConference, DOI: 10.9976/14315, Mar. 2014, https://www.ideals.illinois.edu/bitstream/handle/2142/47263/315_ready.pdf?sequence=2, pp. 675-681.

Yuan, Michael J., "Watson and Healthcare, How natural language processing and semantic search could revolutionize clinical decision support", IBM Corporation, developerWorks, http://www.ibm.com/developerworks/industry/library/ind-watson/, Apr. 12, 2011, pp. 1-14.

\* cited by examiner

SELECTED CRITERION: 610

ANSWERS CORRECTLY QUESTIONS MY CS ANSWERS CORRECTLY BUT WITH DIFFERENT ANSWER

RECOMMENDATION: 630

IT IS RECOMMENDED THAT COLLABORATION WITH PIPELINE C BE INITIATED SINCE IT IS PREDICTED THAT AN X% INCREASE IN CORPUS COVERAGE WILL BE ACHIEVED WITH ONLY A Y% DECREASE IN CONFIDENCE.

CANDIDATE CS COMPARISON BASED ON TEST QUESTION "WHO WAS THE HIGHEST PAID TV STAR IN THE US IN THE 1950S?":

| | TOP ANSWER | EVIDENCE DOCS | CONFIDENCE | |
|---|---|---|---|---|
| MY PIPELINE | GROUCHO MARX | 5 | 0.8 | |
| PIPELINE A | BENJAMIN FAIRLESS | 400 | 0.3 | |
| PIPELINE B | LUCILLE BALL | 300 | 0.75 | |
| PIPELINE C | JACK PARR | 4000 | 0.7 | X |

COGNITIVE SYSTEM COMPARISON AND RECOMMENDATION ENGINE

BACKGROUND

The present application relates generally to an improved data processing apparatus and method and more specifically to mechanisms for providing a cognitive system comparison and recommendation engine.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

Examples, of QA systems are Siri® from Apple, Cortana® from Microsoft®, and question answering pipeline of the IBM Watson™ cognitive system available from International Business Machines (IBM®) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising a processor and a memory, wherein the memory comprises instructions which, when executed by the processor cause the processor to implement a cognitive system collaboration identification and recommendation system (CSCIRS). The method comprises storing, by the CSCIRS in a cognitive system database, entries corresponding to a plurality of cognitive system instances. Each entry identifies operational characteristics of a corresponding cognitive system instance. The method further comprises receiving, by the CSCIRS from a requestor, a request to identify a potential collaborative cognitive system instance and identifying, by the CSCIRS, based on the request and the cognitive system database, a candidate collaborative cognitive system instance. The method also comprises generating, by the CSCIRS, a collaboration recommendation based on the identification and outputting, by the CSCIRS, an output corresponding to the collaboration recommendation.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 6 is an example diagram of a graphical user interface for outputting a comparison of cognitive systems and a recommendation in accordance with one illustrative embodiment.

DETAILED DESCRIPTION

Figure 1:
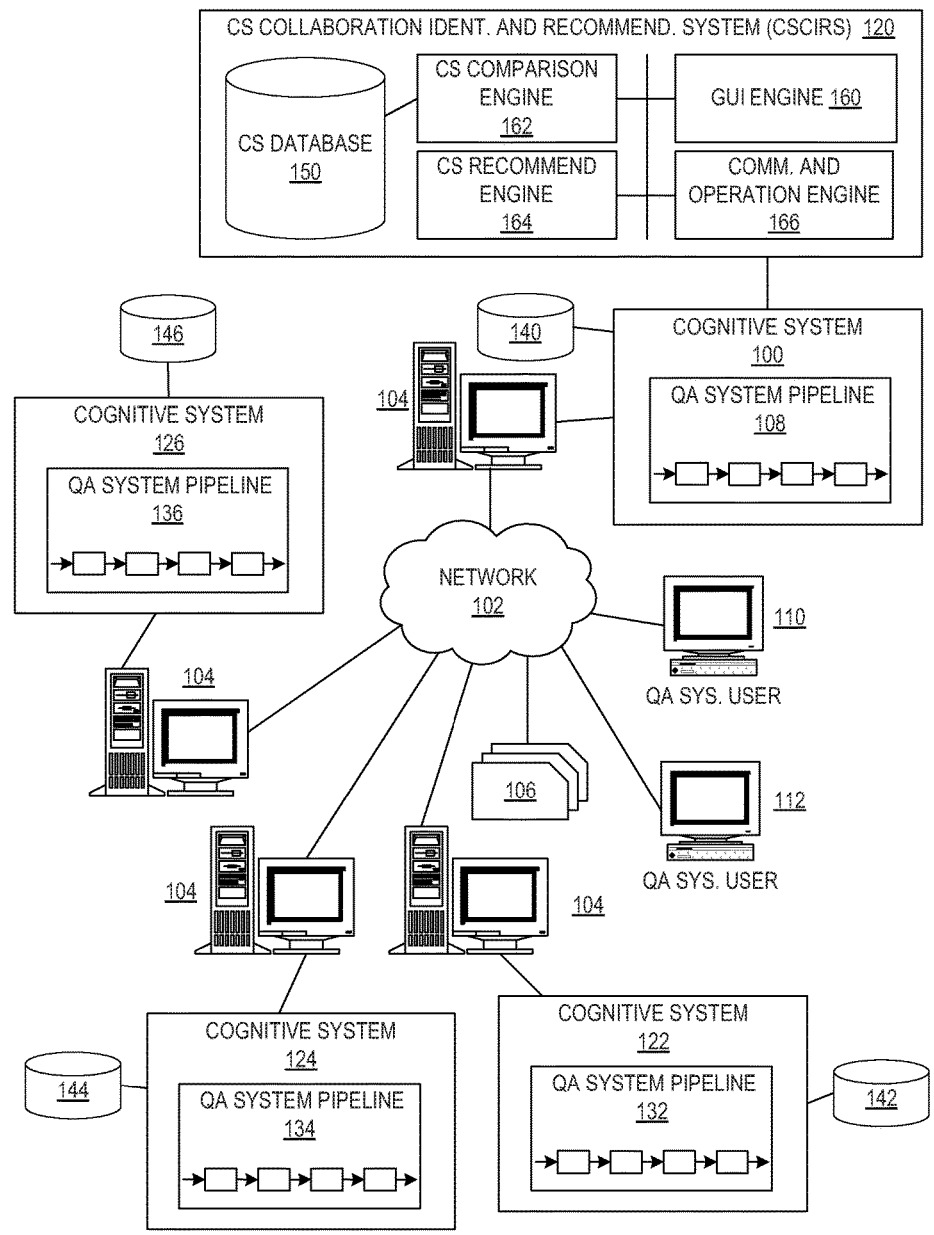
FIG. 1 depicts a schematic diagram of one illustrative embodiment of a question/answer creation (QA) system in a computer network.

Knowledge intensive tasks in the modern age are deeply interdisciplinary. However, people skilled in different fields, or working in complementary sub-domains, of knowledge may not know about each other or the tools that they have developed. These individuals may be working on similar problems that have different names in their disparate fields, or an adjacent problem, whose tools can be combined to create powerful solutions to interdisciplinary problems. If these individuals knew about the endeavors of the others, they could collaborate and combine their efforts as well as the tools they utilize, especially in the realm of curated cognitive systems. However, there is no current mechanism that assists these individuals in finding collaborators based on their associated curated cognitive systems.

The illustrative embodiments comprise mechanisms for providing a cognitive system comparison and recommendation engine. The illustrative embodiments compare cognitive systems to determine similarities and differences and then generate recommendations based on user specified criteria. In some illustrative embodiments, the mechanisms of the illustrative embodiments generate recommendations for extending, enhancing, or otherwise complementing the functionality of one cognitive system by including, in the cognitive system's operation, one or more other cognitive systems whose capabilities are determined to beneficially enhance, augment, or otherwise extend or complement the functionality of the cognitive system. In some illustrative embodiments, recommendations are provided for enhancing, augmenting, or otherwise extending or complementing the corpora upon which a cognitive system operates based on an evaluation of other cognitive systems and their corresponding corpora. Mechanisms are provided for automatically pairing the cognitive system and/or corpora with the one or more other cognitive systems/corpora when performing future cognitive operations.

Often times a research, knowledge worker, or other user or organization builds up and trains a curated cognitive system instance for a particular domain, set of topics, or the like, that is suited to the desired implementation of the cognitive system for achieving a desired purpose. As one example, an instance of an IBM Watson cognitive system that performs natural language processing and question answering, may be trained using a ground truth data set and corresponding training input natural language questions set to adjust the operation of the cognitive system for proper operation for a particular domain. For example, a user or organization may spend considerable time and effort to train a cognitive system to provide medical diagnostic support for a particular category of medical maladies. Multiple users/organizations may establish their own instances of cognitive systems, trained in different ways, such that the instances of the cognitive systems may operate differently and may even generate different results when presented with the same input due to their different training and operational configuration. Because of these differences, it may be the case that different instances of cognitive systems may augment, extend, or otherwise enhance the operations of other cognitive systems, however there is no mechanism present for identifying which, if any, of these cognitive systems are suitable for such a purpose. Moreover, there is no mechanism for automatically implementing such augmentation, extension, or enhancement.

The illustrative embodiments provide mechanisms for performing cognitive system comparisons, recommendations, and automatic implementation of collaboration between cognitive systems and/or corpora based on such comparisons and recommendations. For example, a user or organization (hereafter assumed to be simply a "user" for ease of explanation) may have built up a curated cognitive system and may want to discover other cognitive systems based on a determination of how they compare to his/her own cognitive system instance. Such an operation may be performed in order to discover whether a different cognitive system instance produces a different result than the user's own cognitive system instance, e.g., a different answer is produced to a same input natural language question, discover instances of a cognitive system that operate in a knowledge space that is complementary to, and therefore extends, the knowledge space of the user's own cognitive system, or even to find other users who have created knowledge sources (corpora) for their cognitive system instances that may be beneficial to utilize with the user's own cognitive system.

In one illustrative embodiment, a database of cognitive system instances and their corresponding characteristics is maintained and available for analysis to identify instances of cognitive systems that may extend, enhance, augment, or otherwise complement a cognitive system instance of interest. The characteristics of a cognitive system may include any suitable information that characterizes the way in which the cognitive system operates, the corpora upon which the cognitive system operates, and/or the results generated by the cognitive system. For example, in some illustrative embodiments, the characteristic information may comprise information identifying the types, source identifications, and specific content identifiers (e.g., titles, ISBN, etc.) identifying specific documents or portions of content present in the corpus/corpora upon which the cognitive systems operate, e.g., medical journals including the New England Journal of Medicine, the American Journal of Medicine, and Medicine & Health.

In some illustrative embodiments, a set of test questions may be sent to each of the cognitive systems in the database of cognitive systems and their operational characteristics captured from the cognitive systems for use in comparison of the various cognitive systems. For example, the same set of test questions may be sent to three different instances of a cognitive system, which in this example is a Question and Answer (QA) system such as the IBM Watson™ QA cognitive system, and then, for each test question, the features extracted from the test question by the QA system may be recorded as well as the resulting final answer and/or candidate answers along with their confidence scores, and evidence information/statistics regarding supporting evidence for the final answer and/or candidate answers. This information may be recorded in the database of cognitive system instances for use in performing comparisons of the cognitive systems as discussed hereafter.

Having established a database of cognitive systems and their characteristics, a user may specify criteria for selecting other cognitive system instances from the database that meet the selection criteria. The selection criteria may be specified as criteria relative to the user's own cognitive system. For example, the user may specify that he/she would like to find a QA system that meets one of these criteria:

1) Answers correctly the questions my QA system answers incorrectly (precision failure, where precision is the ratio of the number of correct responses provided by the system to the total number of response provided by the system);
2) Answers correctly the questions on which my QA system has recall failures (where recall is ratio of the number of correct responses provided by the system to the total number of responses that could have been provided given the input data, e.g., corpus/corpora, that is used by the system);
3) Answers correctly (based on its own ground truth) the questions that my QA system answers correctly (based on my own ground truth), yet the answers are not the same;

4) Includes all/most of the same documents contained in my corpus, yet answers questions differently;
5) Includes a high degree of overlapping between the lexical answer types (LATs) of its question set and those in my question set, yet answers X % of questions differently;
6) Has none/few of the same scientific articles in its corpus as I have in mine, but does have a large amount of overlap among the articles/references cited by documents in the two different corpora. That is, look at the overlapping common references cited by two sets of scientific articles. These common references can be retrieved from multiple layers of references (this is directed to a situation where people in two different fields build from common foundational work in another field such that they have similar references);
7) Has a similar/disjoint/more fine grained semantic type ontology compared to my QA system; and
8) Has conflicting answers to my QA system indicative of a potential collaboration.

It should be appreciated that these are only example criteria that a user may specify in association with the finding of other QA system instances that may be able to enhance, extend, augment, or complement the user's own QA system. It should also be appreciated that these criteria are specifically for QA systems, but that the illustrative embodiments are not limited to such and can be used with any cognitive system with corresponding criteria being specified. For example, for a cognitive system that is a natural language search engine, a criterion that may be specified may be of the type "find other search engines that generate conflicting search results to my search engine". By examining various cognitive system comparison criteria, such as that illustrated by example above, a cognitive system may be found that contains overlapping and consistent or disjoint evidence, or subtler notions of similarity, such as when the information in the corpus is somewhat overlapping but also contains complementary additional information that extends the users own cognitive system's corpus.

In some illustrative embodiments, these cognitive system comparison criteria may be automatically applied in response to a user input to a graphical user interface specifying an area of the user's own cognitive system that the user wishes to enhance, extend, augment, or complement. For example, a graphical user interface (GUI) may be provided that represents a particular ontology utilized by the user's own cognitive system. The user may utilize GUI elements to select a portion of the ontology for enhancement. The user may then specify, via selection of GUI elements, one or more of the cognitive system comparison criteria the user wishes to evaluate with regard to the selected portion of the ontology. Alternatively, a pre-established set of one or more cognitive system comparison criteria may be automatically applied with regard to the selected portion of the ontology.

In response to the selection of the portion of the ontology, or a general specification of the entire ontology or the cognitive system as a whole, and the selection or specification of the cognitive system comparison criteria to be used, the illustrative embodiments search the database of cognitive systems to identify one or more cognitive systems whose characteristics satisfy the specified cognitive system comparison criteria. The resulting set of cognitive systems are then provided for the generation and output of recommendations for extending, enhancing, augment, or complementing the user's specified ontology or cognitive system.

The recommendations may specify, for example, whether or not a particular cognitive system and/or its corpus/corpora should be included in the operation of the user's current cognitive system based on an evaluation of the similarities and differences between the operation of the cognitive systems and their corpus/corpora, as well as the expected improvement of the generated results from the collaboration of the cognitive systems and/or corpora. In some illustrative embodiments, the recommendation output may include a graphical/textual representation of the comparison showing various categories of characteristics of the cognitive systems and the comparison of these characteristics between the two (or more) cognitive systems.

In addition, in some illustrative embodiments, actions may be automatically taken to implement the collaboration between cognitive systems by sending appropriate communications and/or initiating operations to facilitate the collaboration. For example, electronic communications may be initiated with the registered owner/operator of the other cognitive systems that the mechanisms of the illustrative embodiments determine are potential collaborators for the user's own cognitive system so as to initiate a dialogue to facilitate the collaboration. In other illustrative embodiments, automated processes may be performed to cause portions of a corpus used by another cognitive system determined to be a potential collaborator, to be ingested or otherwise combined with the corpus/corpora used by the user's cognitive system. Still further, automated operations may be initiated for facilitating distributing of future cognitive operation requests to both the user's cognitive system and the cognitive systems determined to be potential collaborators, as well as aggregating the results generated by the various cognitive systems that are collaborating with one another. Of course other types of communications and automated processes/operations may be generated/performed without departing from the spirit and scope of the illustrative embodiments.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
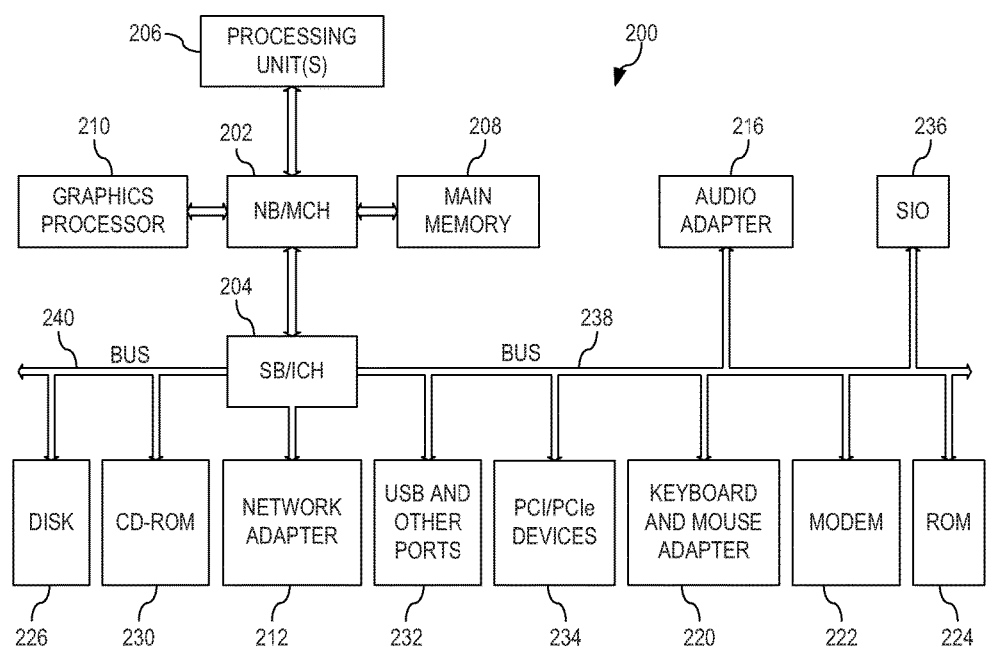
FIG. 2 is a block diagram of an example data processing system in which aspects of the illustrative embodiments are implemented.
Figure 3:
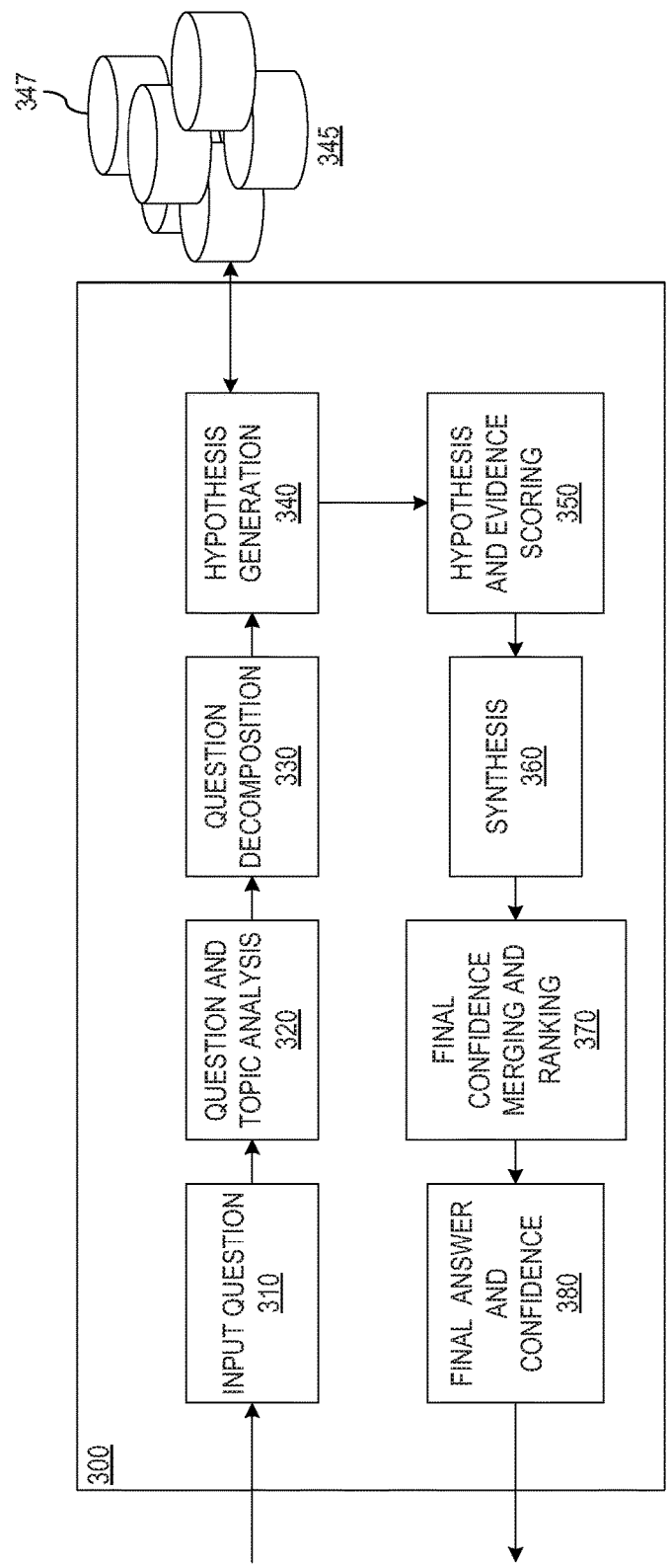
FIG. 3 illustrates a QA system pipeline for processing an input question in accordance with one illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example cognitive system implementing a Question Answering (QA) pipeline (also referred to as a Question/Answer pipeline or Question and Answer pipeline), methodology, and computer program product with which the mechanisms of the illustrative embodiments are implemented. As will be discussed in greater detail hereafter, the illustrative embodiments are integrated in, augment, and extend the functionality of these QA mechanisms of a first cognitive system with regard to identifying other QA mechanisms of other second cognitive systems that may extend, enhance, augment, or otherwise collaborate with the QA mechanisms of the first cognitive system. Identification of these other QA mechanisms may involve performing searches of a QA system database based on user specified criteria or pre-established criteria and optionally a designation of a portion of the first QA mechanism that is desired to be enhance, extended, augmented, or collaborated with (hereafter these are referred to collectively as "extending" the cognitive system or QA system). Recommendations as to other second QA mechanisms that may be potential collaborators with the first QA mechanisms may be generated and output. Moreover, automated processes may be executed to initiate communication and/or perform operations to facilitate collaboration between the first QA mechanism and one or more of the second QA mechanisms.

It should be appreciated that while the illustrative embodiments will be described in the context of a cognitive system that implements QA mechanisms, which is also referred to herein as a QA system, the illustrative embodiments are not limited to such. Rather, the mechanisms of the illustrative embodiments may be implemented with regard to any type of cognitive system who's operational and results characteristics may be captured and analyzed to characterize the cognitive system for use in finding potential collaboration of cognitive systems for enhancing the functionality of cognitive systems. For example, other types of cognitive systems with which the mechanisms of the illustrative embodiments may be utilized include natural language search engines, knowledge extraction systems, various types of recommendation systems that operate on knowledge bases, and the like.

Since the example embodiments will make references to a cognitive system utilizing QA system mechanisms, which include instances of QA system pipelines, it is important to first have an understanding of how question and answer creation in a cognitive system implementing a QA pipeline is implemented before describing how the mechanisms of the illustrative embodiments are integrated in and augment such QA mechanisms. It should be appreciated that the QA mechanisms described in FIGS. 1-3 are only examples and are not intended to state or imply any limitation with regard to the type of QA mechanisms with which the illustrative embodiments are implemented. Many modifications to the example cognitive system shown in FIGS. 1-3 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, intelligent search algorithms, such as Internet web page searches, for example, medical diagnostic and treatment recommendations, and other types of recommendation generation, e.g., items of interest to a particular user, potential new contact recommendations, or the like.

IBM Watson™ is an example of one such cognitive system which can process human readable language and identify inferences between text passages with human-like high accuracy at speeds far faster than human beings and on a larger scale. In general, such cognitive systems are able to perform the following functions:

Navigate the complexities of human language and understanding

Ingest and process vast amounts of structured and unstructured data

Generate and evaluate hypothesis

Weigh and evaluate responses that are based only on relevant evidence

Provide situation-specific advice, insights, and guidance

Improve knowledge and learn with each iteration and interaction through machine learning processes Enable decision making at the point of impact (contextual guidance)

Scale in proportion to the task

Extend and magnify human expertise and cognition

Identify resonating, human-like attributes and traits from natural language

Deduce various language specific or agnostic attributes from natural language

High degree of relevant recollection from data points (images, text, voice) (memorization and recall)

Predict and sense with situational awareness that mimic human cognition based on experiences Answer questions based on natural language and specific evidence In one aspect, cognitive systems provide mechanisms for answering questions posed to these cognitive systems using a Question Answering pipeline or system (QA system). The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

As mentioned above, QA pipeline and mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, type of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify these question and answer attributes of the content.

Operating on such content, the QA pipeline generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a cognitive system 100 implementing a question answering (QA) pipeline 108 in a computer network 102. One example of a question/answer generation operation which may be used in conjunction with the principles described herein is described in U.S. Patent Application Publication No. 2011/0125734, which is herein incorporated by reference in its entirety. The cognitive system 100 is implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The cognitive system 100 and network 102 enables question/answer (QA) generation functionality for one or more cognitive system users via their respective computing devices 110-112. Other embodiments of the cognitive system 100 may be used with components, systems, subsystems, and/or devices other than those that are depicted herein.

The cognitive system 100 is configured to implement a QA pipeline 108 that receive inputs from various sources. For example, the cognitive system 100 receives input from the network 102, a corpus of electronic documents 106, cognitive system users, and/or other data and other possible sources of input. In one embodiment, some or all of the inputs to the cognitive system 100 are routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus of data 106 for use as part of a corpus of data with the cognitive system 100. The document includes any file, text, article, or source of data for use in the cognitive system 100. QA system users access the cognitive system 100 via a network connection or an Internet connection to the network 102, and input questions to the cognitive system 100 that are answered by the content in the corpus of data 106. In one embodiment, the questions are formed using natural language. The cognitive system 100 parses and interprets the question via a QA pipeline 108, and provides a response to the cognitive system user, e.g., cognitive system user 110, containing one or more answers to the question. In some embodiments, the cognitive system 100 provides a response to users in a ranked list of candidate answers while in other illustrative embodiments, the cognitive system 100 provides a single final answer or a combination of a final answer and ranked listing of other candidate answers.

The cognitive system 100 implements the QA pipeline 108 which comprises a plurality of stages for processing an input question and the corpus of data 106. The QA pipeline 108 generates answers for the input question based on the processing of the input question and the corpus of data 106. The QA pipeline 108 will be described in greater detail hereafter with regard to FIG. 3.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a QA pipeline of the IBM Watson™ cognitive system receives an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question. The QA pipeline of the IBM Watson™ cognitive system then performs deep analysis on the language of the input question and the language used in each of the portions of the corpus of data found during the application of the queries using a variety of reasoning algorithms. The scores obtained from the various reasoning algorithms are then weighted against a statistical model that summarizes a level of confidence that the QA pipeline of the IBM Watson™ cognitive system has regarding the evidence that the potential response, i.e. candidate answer, is inferred by the question. This process is be repeated for each of the candidate answers to generate ranked listing of candidate answers which may then be presented to the user that submitted the input question, or from which a final answer is selected and presented to the user. More information about the QA pipeline of the IBM Watson™ cognitive system may be obtained, for example, from the IBM Corporation website, IBM Redbooks, and the like. For example, information about the QA pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As shown in FIG. 1, the cognitive system 100 is further augmented, in accordance with the mechanisms of the illustrative embodiments, to include logic implemented in specialized hardware, software executed on hardware, or any combination of specialized hardware and software executed on hardware, for implementing a cognitive system (CS) collaboration identification and recommendation system (CSCIRS) 120. The cognitive system collaboration identification and recommendation system 120 provides a user interface for receiving requests for the identification and recommendation of other cognitive systems, or instances of QA mechanisms in the same or different cognitive systems, that are potential collaborators with a user's own cognitive system and/or instance of a QA mechanism, e.g., a curated instances of a QA pipeline 108. It should be appreciated that other computing devices coupled to the network 102 may have their own instances of cognitive systems and/or QA pipelines 108 which are trained and curated in different ways from the user's cognitive system and QA pipeline 108, and may operate on different corpora from each other, such that they generate different feature extraction results and different candidate answer generation results. Thus, given the same input, two different instances of a QA pipeline 108 may generate different extracted features and different candidate answer results. Thus, for example, various servers 104 may have associated cognitive systems 122-126 and their instances of QA pipelines 132-136 which are individually trained and curated using their own or shared corpora 142-144. These cognitive systems 100, 122-126 and/or instances of QA pipelines 108, 132-136 may be registered with a cognitive system database 150 which includes characteristic information that is collected from these cognitive systems 100, 122-126 and/or QA pipeline instances 108, 132-136, such as in response to the submission of a common set of test questions as input to the various registered cognitive systems 100, 122-126 and/or QA pipeline instances 108, 132-136.

As mentioned above, the characteristics of a cognitive system may include any suitable information that characterizes the way in which the cognitive system operates, the corpora upon which the cognitive system operates, and/or the results generated by the cognitive system. Again, in some illustrative embodiments, the characteristic information may comprise information identifying the types, source identifications, and specific content present in the corpus/corpora upon which the cognitive systems operate, e.g., medical journals including the New England Journal of Medicine, the American Journal of Medicine, and Medicine & Health. Also, in some illustrative embodiments, a set of test questions may be sent to each of the cognitive systems in the database of cognitive systems and their operational characteristics captured from the cognitive systems for use in comparison of the various cognitive systems. These operational characteristics may include the features extracted from the test question as well as the resulting final answer and/or candidate answers along with their confidence scores. This information may be recorded in the CS database 150 for use in performing comparisons of the cognitive systems by the CS comparison engine 162.

With the CS database 150 populated with entries corresponding to various registered CS and/or QA system pipeline instances, the CS collaboration identification and recommendation system 120 receives a request, via the GUI engine 160, to identify and recommend collaboration with other cognitive systems (CSs) or extension of the current cognitive system (CS), e.g., CS 100. For example, a user associated with the cognitive system 100 may log onto or otherwise access the CS collaboration identification and recommendation system 120 and be presented with a GUI generated by the GUI engine 160 through which the user specifies criteria for selecting other cognitive system and/or QA system pipeline instances of interest for collaboration or extension of the cognitive system 100 and/or QA system pipeline 108. In some illustrative embodiments, the GUI may present to the user a graphical representation of the ontology employed by the cognitive system 100 and/or QA system pipeline 108 such that the user may specify a portion of the ontology that the user wishes to extend or for which collaboration is sought such that a pre-defined set of criteria for selecting other cognitive systems/QA system pipelines may be automatically applied with regard to the selected portion of the ontology.

In response to the receipt of the request, the CS comparison engine 162 identifies the current cognitive system 100 and/or QA system pipeline 108 instance and looks up a corresponding entry in the CS database 150. In addition, the CS comparison engine 162 retrieves entries for other CS and/or QA system pipeline instances for comparison. The identification of the other CS and/or QA system pipeline instances may be based on characteristics specified in the request and corresponding selection criteria associated with those characteristics. For example, if the user's request includes a selection of a portion of an ontology, a domain, topics, or the like, associated with the selected portion of the ontology may be used to identify other CS and/or QA system pipeline instances that are directed to similar domains, topics, or the like. As noted above, the selection criteria in the request may be specified as criteria relative to the user's own cognitive system's characteristics. For example, the user may specify that he/she would like to find a QA system that meets one of the criteria examples previously discussed above, or other similar types of criteria of various specificity and combination of characteristics.

The retrieved entries from the CS database 150 are used to compare and identify similarities and differences in the characteristics of the various CS and/or QA system pipeline instances. The similarities and differences are correlated with the selection criteria specified in the request and/or in a pre-defined set of criteria to determine which of the other CS or QA system pipeline instances meet the specified or pre-defined set of criteria. The results of the comparison are provided to the CS recommendation engine 164.

The CS recommendation engine 164 works in conjunction with the GUI engine 160 to generate a GUI that is output to the user that originated the request. The GUI includes a comparison of the characteristics of the user's CS 100 and/or QA system pipeline instance 108 with those of one or more other CS 122-126 and/or QA system pipeline instances 132-136, and/or a comparison of the corpus/corpora 140 associated with the CS 100 and/or QA system pipeline instance 108 to the associated corpora 142-146 of the other CS 122-126 and/or QA system pipeline instances 132-136. In some illustrative embodiments, the CS recommendation engine 164 further generates recommendations for extending, enhancing, or otherwise complementing the functionality of the cognitive system 100 and/or QA system pipeline instance 108 by including, in the cognitive system's operation, one or more other cognitive systems 122-126, one or more QA system pipeline instances 130-136, and/or one or more of content from the associated corpora 142-146. These recommendations may be based on an evaluation of the similarities and differences according to established logic and one or more similarity/difference thresholds that identify which of these elements have capabilities that are determined to beneficially enhance, augment, or otherwise extend or complement the functionality of the cognitive system 100 and/or QA system pipeline instances 108.

The recommendations may specify, for example, whether or not a particular cognitive system, the QA system pipeline instance, and/or its corpus/corpora should be included in the operation of the user's current cognitive system 108 based on an evaluation of the similarities and differences between the operation of the cognitive systems 100 and 122-126, the QA system pipeline instances 108 and 132-136, and their corpus/corpora 140-146, as well as the expected improvement of the generated results from the collaboration of the cognitive systems, QA system pipeline instances, and/or corpora. In some illustrative embodiments, the recommendation output that is generated via the GUI engine 160 may include a graphical/textual representation of the comparison showing various categories of characteristics of the cognitive systems 100 and 120-126, the QA system pipeline instances 108 and 132-136, and/or the corpora 140-146, and the comparison of these characteristics between the two (or more) cognitive systems, QA system pipeline instances, and/or corpora.

In addition, in some illustrative embodiments, the communication and operation engine 166 may automatically initiate actions to implement the collaboration between cognitive systems and/or QA system pipeline instances, e.g., QA system pipeline instance 108 and QA system pipeline 136, by sending appropriate communications and/or initiating operations to facilitate the collaboration. For example, electronic communications may be initiated with the registered owner/operator of the other cognitive system 126, after determining that the cognitive system 126 and/or QA system pipeline 136 is a potential collaborator for the user's own cognitive system 100 and/or QA system pipeline 108, so as to initiate a dialogue to facilitate the collaboration. In other illustrative embodiments, automated processes may be performed to cause portions of a corpus 146 used by the other cognitive system 126 and/or QA system pipeline 136, to be ingested or otherwise combined with the corpus/corpora 140 used by the user's cognitive system 100 and/or QA system pipeline 108. Still further, automated operations may be initiated by the communication and operation engine 166 for facilitating distributing of future cognitive operation requests, e.g., processing of an input natural language question, to both the user's cognitive system 100 and/or QA system pipeline 108, and the cognitive system 126 and/or QA system pipeline 136 determined to be potential collaborators, as well as aggregating the results generated by the various cognitive systems 100, 126 and/or QA system pipelines 108, 136 that are collaborating with one another.

Thus, the illustrative embodiments provide mechanisms for facilitating the comparison of cognitive systems, the identification of potential collaborations between cognitive systems and enhancements that may be applied to a given cognitive system, the generation of recommendations with regard to collaborations/enhancements, and the initiating of operations to facilitate such collaborations/enhancements.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a cognitive system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline, of a cognitive system, for processing an input question in accordance with one illustrative embodiment. The QA system pipeline of FIG. 3 may be implemented, for example, as QA pipeline 108 of cognitive system 100 in FIG. 1. It should be appreciated that the stages of the QA pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA pipeline of FIG. 3 is augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA pipeline 300 comprises a plurality of stages 310-380 through which the cognitive system operates to analyze an input question and generate a final response. In an initial question input stage 310, the QA pipeline 300 receives an input question that is presented in a natural language format. That is, a user inputs, via a user interface, an input question for which the user wishes to obtain an answer, e.g., "Who are Washington's closest advisors?" In response to receiving the input question, the next stage of the QA pipeline 300, i.e. the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?," the focus is "drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

The QA pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexity may be used to generate scores for candidate answers and evidence without departing from the spirit and scope of the present invention.

In the synthesis stage 360, the large number of scores generated by the various reasoning algorithms are synthesized into confidence scores or confidence measures for the various hypotheses. This process involves applying weights to the various scores, where the weights have been determined through training of the statistical model employed by the QA pipeline 300 and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of the QA pipeline 300 that identifies a manner by which these scores may be combined to generate a confidence score or measure for the individual hypotheses or candidate answers. This confidence score or measure summarizes the level of confidence that the QA pipeline 300 has about the evidence that the candidate answer is inferred by the input question, i.e. that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

Referring again to FIG. 1, as discussed above, the QA system pipeline 300 may be the basis for comparison with other QA system pipeline instances to identify QA system pipeline instances that may extend, enhance, augment, or otherwise collaborate with the QA system pipeline 300. That is, the input questions 310 provided to the QA system pipeline 300 may be a test set of questions with associated ground truth data indicating the correct answers for the test set of questions. The QA system pipeline 300 may process each test question in the test set of questions in the manner previously described above. The features extracted by the QA system pipeline 300 may be recorded along with the candidate answers, final answer, and corresponding confidence scores, in the cognitive system database 150. This information may be analyzed by the cognitive system comparison engine 162 and compared against similar characteristic information collected for other QA system pipelines to generate comparison information that may be utilized by a cognitive system recommendation engine 164 to generate recommendations for enhancing the QA system pipeline or provide collaborations with other QA system pipeline instances, as discussed above.

Figure 4:
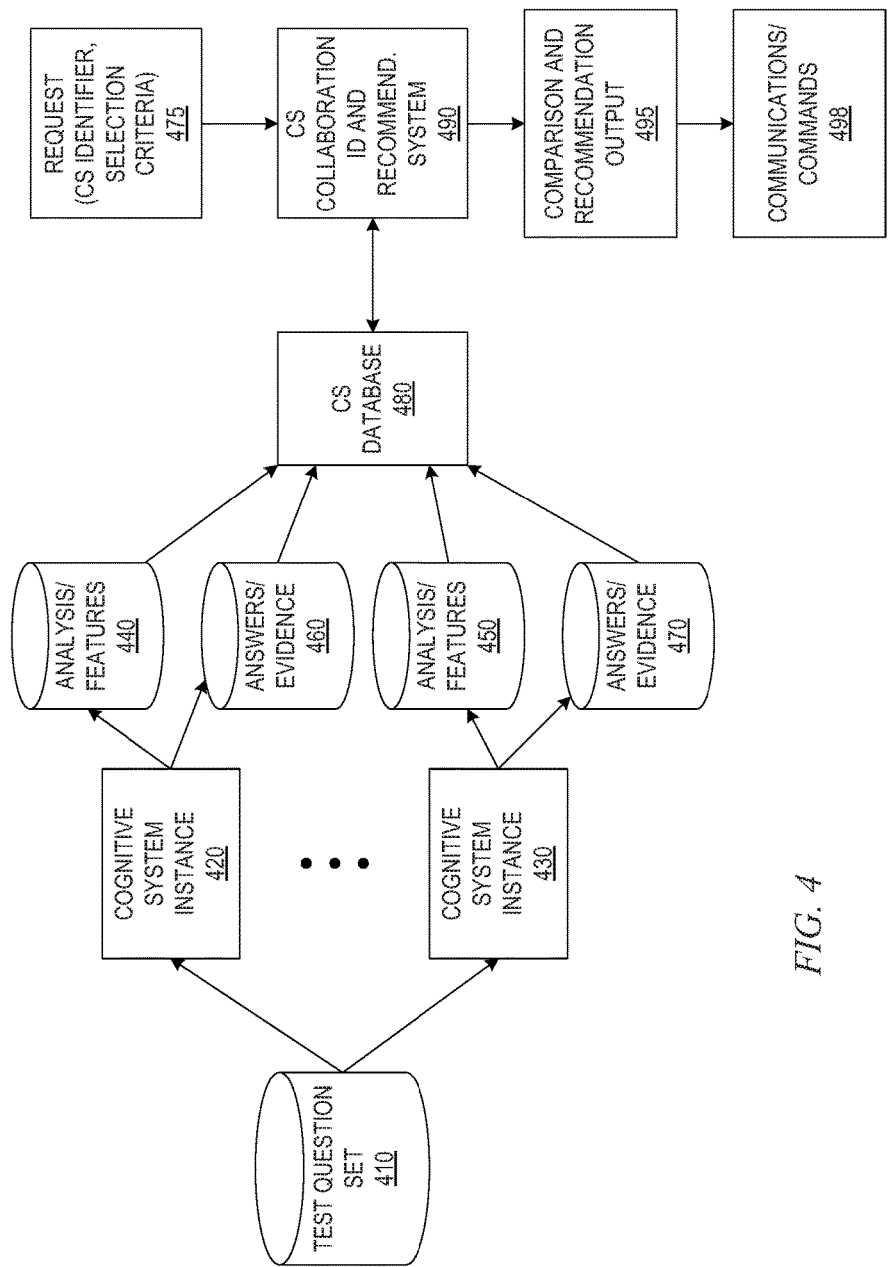
FIG. 4 is an example diagram illustrating an operation for generating entries in a cognitive system database in accordance with one illustrative embodiment.

FIG. 4 is an example diagram illustrating an operation for generating entries in a cognitive system database in accordance with one illustrative embodiment. As an example scenario in which to provide a context for the example shown in FIG. 4, assume that a researcher has trained and curated a QA system pipeline instance, such as that shown in FIG. 3, for a particular domain and has identified that the QA system pipeline instance (instance 1), while generating good results for the domain, is not able to adequately answer key questions of interest. The researcher wants to find another QA system pipeline instance (instance 2) that makes progress on those key questions and corresponding answers using largely or somewhat the same basis of evidence as the researcher's own QA system pipeline instance (instance 1) such that the researcher can trust and evaluate the output of instance 2.

In such a scenario, the researcher may generate a set of test questions comprising one or more targeted questions that correspond to those key questions that the researcher wishes to find a QA system pipeline instance (instance 2) that will enhance, extend, augment, or otherwise complement the researcher's own QA system pipeline instance (instance 1). The set of test questions 410 are submitted to a plurality of QA system pipeline instances 420 and 430 which process each of the questions in the set of test questions 410 in a manner as discussed above. For example, QA system pipeline instance 420 may correspond to instance 1 while QA system pipeline instance 430 may correspond to instance 2 above. As part of the processing of the questions, the QA system pipeline instances 420, 430 generate question analysis output and extracted features, e.g., LAT, focus, key words, key phrases, etc. 440, 450. In addition, the QA system pipeline instances 420, 430 generate candidate answers, final answers, confidence scores, and supporting evidence passages 460, 470. The question analysis output and extracted features 440, 450 and the answers, confidence scores, and supporting evident passages 460, 470 are logged into an entry corresponding to the QA system pipeline instance 420, 430 in the cognitive system database 480.

Having generated these characteristics 440, 450, 460, and 470 of the operation of the QA system pipeline instances 420, 430 and stored them into corresponding entries in the cognitive system database 480, comparisons may be performed by the cognitive system collaboration identification and recommendation system 490 to identify QA system pipeline instances that may extend, enhance, augment, or otherwise collaborate with another QA system pipeline instance. For example, the researcher mentioned above, may send a request to the mechanisms of the illustrative embodiments, to identify other QA system pipeline instances (instance 2) for extending, enhancing, augmenting, or otherwise collaborating with the researcher's own QA system pipeline instance (instance 1). The request 475 may specify the QA system pipeline instance (instance 1) that is associated with the originator of the request as well as the selection criteria for selecting other QA system pipeline instances that are potential extensions, enhancements, augmentations, or collaborators with the requestor's (in this example, the researcher) QA system pipeline instance (instance 1). The cognitive system collaboration identification and recommendation system 490 may receive the request, retrieve an entry from the cognitive system database 480 corresponding to the identified QA system pipeline instance (instance 1) of the requestor and perform comparisons of characteristics corresponding to other entries in the cognitive system database 480 and evaluate the results of such comparisons against the selection criteria specified in the request 475.

The results of the evaluation of the comparison results against the selection criteria may be used to generate a comparison output 495 that highlights the elements of the results that satisfy the selection criteria. The comparison output 495 may further include recommendations as to which, if any, of the QA system pipeline instances that meet the selection criteria should be included as extensions, enhancements, augmentations, or collaborators of the requestor's QA system pipeline instance based on an evaluation of the predicted benefit that would be achieved, e.g., an evaluation of the improvement in answer confidence scoring, an improvement in evidential support for candidate answers, an improvement in subject matter coverage by the corresponding corpora, or the like.

To illustrate the evaluation of predicted benefit, consider the following examples. The scenario illustrated by these examples is one in which the user of a QA system pipeline instance is browsing the results generated by candidate QA system pipeline instances for enhancing his/her own QA system pipeline instance and is able to specify selection criteria about either the top returned answer or the concepts found by the QA system pipeline instances in the input question.

In a first example, illustrated in the table below, a user asks the question "Who was the highest paid TV star in the US in the 1950s?" with the following answers being returned by multiple QA system pipelines, filtered based on question/answer evidence score (where "My Pipeline" is the original requestor's QA system pipeline):

TABLE 1

Example 1 of Results Returned by Multiple Pipelines for Evaluation of Predicted Benefit

|  | Top Candidate Answer Returned | Num. Evidence Docs. | Confidence Score |
| --- | --- | --- | --- |
| My Pipeline | Groucho Marx | 5 | 0.8 |
| Pipeline A | Benjamin Fairless | 400 | 0.3 |
| Pipeline B | Lucille Ball | 300 | 0.75 |
| Pipeline C | Jack Parr | 4000 | 0.7 |

In the example shown in Table 1, logic of the cognitive system collaboration identification and recommendation system 490 may evaluate the top candidate answers returned by the various pipelines, and utilize a function based on the amount of evidence and confidence scores associated with the top answers returned by the various pipelines to select a pipeline that will provide the most additional predicted benefit to the operation of the requestor's pipeline. For example, a function may be provided that balances the amount of evidence with the corresponding confidence score to identify a predicted benefit to the requestor's pipeline. This function may further take into consideration the results generated by the requestor's pipeline to make sure that the addition of the other pipeline will improve the performance of the requestor's pipeline. For example, in the results shown in Table 1, while Pipeline A returns a top answer that has much more evidence than the requestor's pipeline and pipeline B, the confidence score is considerably lower and unlikely to improve the operation of the requestor's pipeline. Pipeline B provides more evidence than pipeline A and the requestor's pipeline and has the highest confidence score of the alternatives, other than the requestor's pipeline. Pipeline C has only slightly lower confidence than pipeline B but has a considerable amount more evidence supporting the top answer. Thus, it may be determined that the amount of supporting evidence that pipeline C can provide to generation of candidate answers, along with the relatively high confidence score calculation (although not the highest), is sufficient to predict a particular benefit to the operation of the requestor's pipeline.

Table 2 shows an alternative comparison of QA system pipeline instances based on the term coverage in the corpus/corpora associated with the various QA system instances:

TABLE 2

Example 2 of Concept Coverage Comparison of QA System Pipeline Instances

|  | Term | Concept | Document Coverage of Concept |
| --- | --- | --- | --- |
| My pipeline | TV | television | 50 |
| Pipeline A | TV | television | 5000 |
| Pipeline B | TV | television | 500000 |
| Pipeline C | TV | television | 4000 |

In this example shown in Table 2, using the same input question as in the previous example, a term "TV" is extracted from the input question by each of the QA system pipeline instances and correlated to various concepts, e.g., television, Tuvalu, transitive verb, etc., with each having its own supporting evidence document count. The user may be more interested in one concept over others, e.g., "television" in this example, and may select this concept from a listing. As a result, the table comparison shown in Table 2 may be utilized to compare the various pipeline instances with regard to document coverage of the selected concept. From this comparison, it can be seen that pipeline B provides a significantly larger set of documents that refer to the concept of television and is a strong candidate for augmenting the operation of the user or requestor's pipeline which only has 50 documents covering the concept. Of course, each of the pipelines have a greater coverage than the requestor's pipeline and thus, each may be considered as potential candidates for augmenting the requestor's pipeline and in fact each may be recommended as potential collaborators.

In some illustrative embodiments, the generated recommendations may trigger the initiation of communications/commands being sent to the operators of the identified other QA system pipeline instances (e.g., instance 2) to initiate enhancement, extension, augmentation, or collaboration. In some illustrative embodiments, an electronic communication, e.g., electronic mail message, instant message, or the like, is transmitted to the identified contact information associated with the QA system pipeline instance (e.g., instance 2) in the entry in the cognitive system database 480 requesting a dialogue for performing a collaboration between the QA system pipeline instances, e.g., instance 1 and instance 2. In other illustrative embodiments, commands may be sent to the cognitive systems associated with the QA system pipeline instances, e.g., instance 1 and/or instance 2, to initiate operations for performing such collaboration. For example, commands may be automatically transmitted to facilitate the forwarding of input questions to other QA system pipeline instances and aggregating the results generated from the multiple QA system pipeline instances. Commands may be automatically transmitted to incorporate or ingest portions of another QA system pipeline instance's corpus or corpora. Other types of commands may likewise be sent to facilitate various types of collaboration between QA system pipeline instances without departing from the spirit and scope of the illustrative embodiments.

Figure 5:
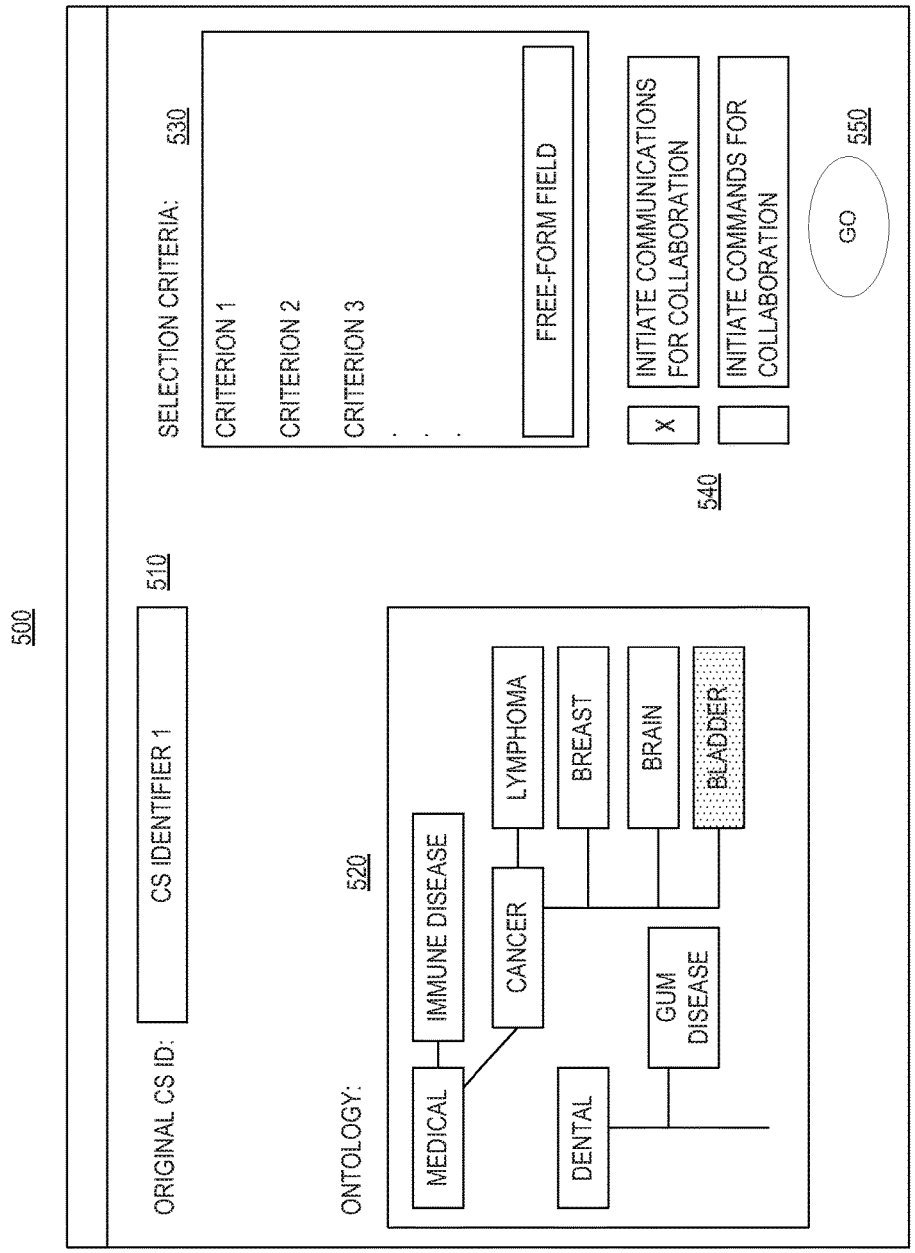
FIG. 5 is an example diagram of a graphical user interface through which a request for comparing cognitive systems may be provided in accordance with one illustrative embodiment.

As noted above, one way in which a request for identification of cognitive system instances, e.g., QA system pipeline instances, that are potential or candidate collaboration instances for extending, enhancing, augmenting, or otherwise collaborating with a requestor cognitive system instance is to receive user input via a graphical user interface that facilitates the identification of the requestor cognitive system instance, or a portion thereof, and one or more selection criteria for selecting the potential or candidate collaboration instances. FIG. 5 is an example diagram of a graphical user interface through which a request for comparing cognitive systems may be provided in accordance with one illustrative embodiment. As shown in FIG. 5, the graphical user interface (GUI) 500 includes a GUI field 510 for identification of the requestor's cognitive system instance, which may be automatically populated based on the user's logon or accessing the GUI and correlation data structures that correlate the user's identification with the identification of a cognitive system instance. Alternatively, the user may modify the identifier in this field 510, such as in the case where the user has multiple cognitive system instances and wishes to specify which of the cognitive system instances is to be the basis for the request.

The GUI 500 may further comprise a portion 520 in which an ontology associated with the identified cognitive system instance may be graphically depicted. The ontology is a set of concepts, topics, domains, or the like, which are associated with the cognitive system instance, e.g., the concepts, topics, domains for which the cognitive system has been trained and curated to operate on. A user may utilize a pointing device or any other user input device to select a portion of the ontology as a focus of the request, for example, and thereby identify concepts, topics, domains, or the like, that are the area where the user wishes to extend, enhance, augment, or otherwise find collaborators to improve the performance of the cognitive system instance. The selection of a portion of the ontology may be used as a further specification of selection criteria for use in selecting potential or candidate cognitive system instances, e.g., only cognitive system instances that likewise are trained or curated to operate on similar concepts, topics, domains, etc. are considered for selection.

The GUI 500 further includes a portion 530 for specifying other selection criteria to be utilized for selecting cognitive system instances for potential collaboration or enhancement/extension of the requestor's cognitive system instance (identified in field 510). The criteria may be one or more pre-defined criteria which are selectable from a pre-defined listing or may be entered via a free-form text entry field that is then parsed and processed using natural language processing techniques to extract the selection criteria to be utilized. As mentioned above, the selection criteria may be specified as relative to the identified cognitive system instance's characteristics and may be keyed to similarities or differences in characteristics relative to the identified cognitive system instance's characteristics, examples of which have been previously listed above.

The GUI 500 may further include fields 540 for specifying whether to automatically initiate communications, commands, or the like, to facilitate collaboration with the cognitive system instances identified via the mechanisms of the illustrative embodiments. A GUI element 550 may further be provided to initiate the performance of the operations for comparison and recommendation generation in accordance with the illustrative embodiments based on the user's input to the GUI 500 provided in the other fields 510-540.

FIG. 6 is an example diagram of a graphical user interface (GUI) for outputting a comparison of cognitive systems and a recommendation in accordance with one illustrative embodiment. It should be appreciated that FIG. 6 is only an example of one possible implementation of a GUI for outputting a comparison of cognitive systems and a recommendation. Many other configurations, having the same or different content, may be used without departing from the spirit and scope of the present invention.

As shown in FIG. 6, the GUI 600 includes a field 610 for specifying the selection criteria that was selected by the user in evaluating other cognitive system instances for potential enhancement of the user's own cognitive system instance. In the depicted example, the user has selected the criteria "Answers correctly questions my cognitive system (CS) answers correctly but with different answer." The results of the comparison are shown in field 620 with regard to a test question submitted to each of the possible cognitive system instances. In this case, the test question is "who was the highest paid TV star in the US in the 1950s?" with the table in field 620 representing the comparison of operational results generated by the various pipeline instances A-C and the user's own pipeline instance. The resulting recommendation is shown in recommendation field 630. The recommendation may be generated by applying logic and/or one or more functions to the operational results generated by the comparison to determine which, if any, of the candidate cognitive system instances should be included or incorporated into the operation of the user's own cognitive system instance via a collaboration.

Figure 7:
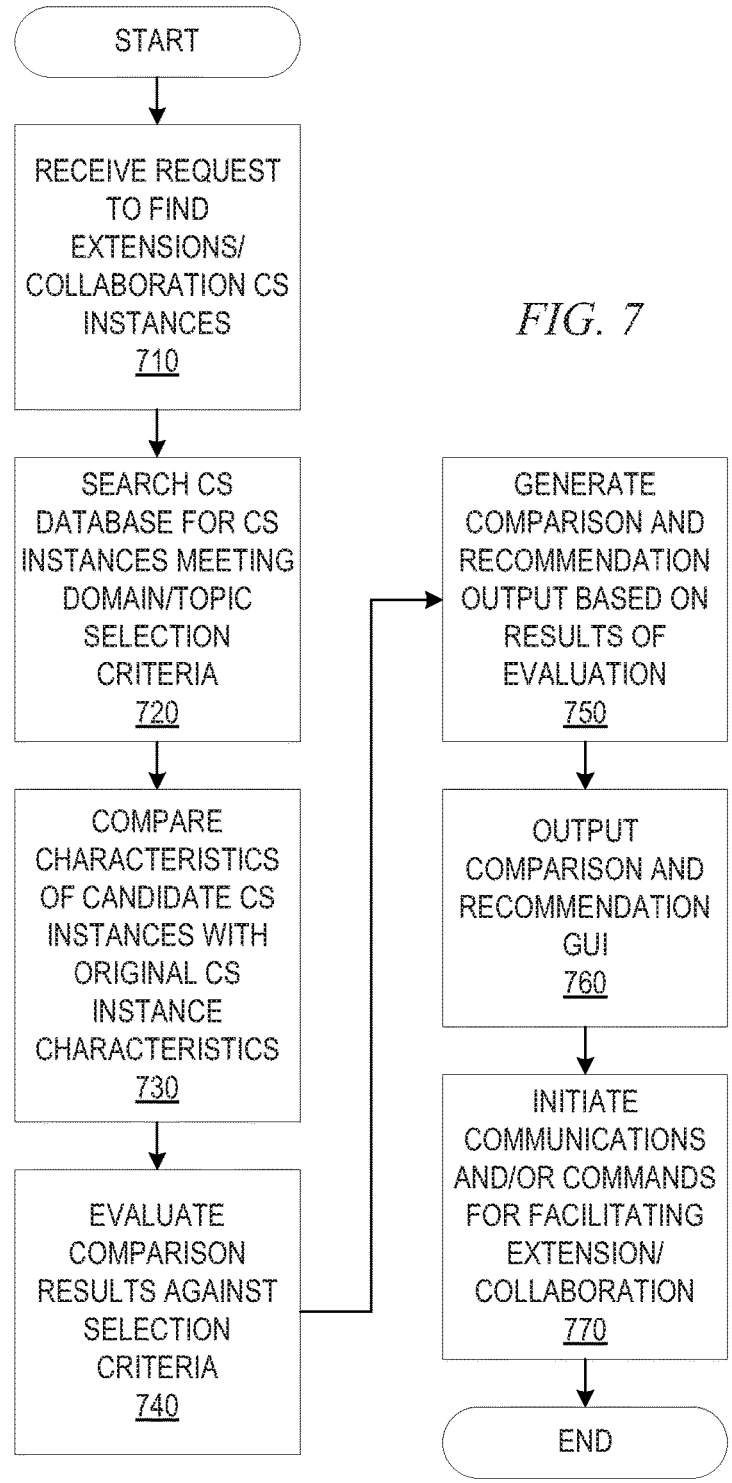
FIG. 7 is a flowchart outlining an example operation for comparing cognitive systems and generating recommendations in accordance with one illustrative embodiment.

FIG. 7 is a flowchart outlining an example operation for comparing cognitive systems and generating recommendations in accordance with one illustrative embodiment. As shown in FIG. 7, the operation starts by receiving a request to find other instances of cognitive systems that will extend, enhance, augment, or otherwise collaborate with an original cognitive system instance so as to improve the functionality of the original cognitive system instances (step 710). As discussed above, this request may identify the original cognitive system instance and the selection criteria for use in selecting other cognitive system instances, which may include a specification of a portion of an ontology of the original cognitive system instance, for example. The cognitive system (CS) database is searched for instances of cognitive systems that correspond to specified domains, topics, etc. associated with the original cognitive system that are to be a basis of the search (step 720). For example, as noted above, a user may specify a portion of an ontology of the original cognitive system instance which may indicate the particular domain, topics, or the like, for which extension/collaboration of the original cognitive system instance is desired.

The operational characteristics of the identified other cognitive system instances are then compared with the operational characteristics of the original cognitive system instance to identify similarities and differences (step 730). The similarities and differences are then evaluated against the selection criteria specified in the original request to identify which of the cognitive system instances meet the specified criteria (step 740). A comparison and recommendation output is generated based on the results of the evaluation (step 750) and the comparison and recommendation is output via a GUI or other suitable output mechanism (step 760). As discussed above, the output GUI may include a representation of the comparison between cognitive system characteristics, a natural language recommendation as to which of the other cognitive system instances to utilize to extend or collaborate with the original cognitive system instance and how, and the like. Optionally, in some illustrative embodiments, the recommendation may trigger the automatic initiation of communications or transmission of commands for facilitating the extension and/or collaboration (step 770). The operation then ends.

Thus, the illustrative embodiments provide mechanisms for automatically performing comparisons between the operational characteristics of cognitive system instances so as to identify similarities and differences between the ways in which these cognitive system instances operate. The comparisons may be used as a basis for identifying recommendations for extending, enhancing, or augmenting an original cognitive system instance, or otherwise collaborating with other cognitive system instances, so as to improve the operation of the original cognitive system instance. Moreover, mechanisms are provided for outputting such recommendations and representations of such comparisons as well as automatically initiating communications/commands for facilitating such extensions, enhancements, augmentations, and/or collaborations.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising a processor and a memory, wherein the memory comprises instructions which, when executed by the processor cause the processor to implement a cognitive system collaboration identification and recommendation system (CSCIRS), the method comprising:

storing, by the CSCIRS in a cognitive system database, entries corresponding to a plurality of cognitive system instances, wherein each entry identifies operational characteristics of a corresponding cognitive system instance;

receiving, by the CSCIRS from a requestor, a request to identify a potential collaborative cognitive system instance;

identifying, by the CSCIRS, based on the request and the cognitive system database, a candidate collaborative cognitive system instance;

generating, by the CSCIRS, a collaboration recommendation based on the identification; and outputting, by the CSCIRS, an output corresponding to the collaboration recommendation, wherein the collaboration recommendation comprises a recommendation as to whether or not the candidate collaborative cognitive system instance should be incorporated with a requestor cognitive system instance associated with the requestor based on an evaluation of similarities and differences between the candidate collaborative cognitive system instance and the requestor cognitive system instance.

2. The method of claim 1, wherein the operational characteristics of the corresponding cognitive system instance corresponding to the entry comprises at least one of a type of content present in a corpus upon which the corresponding cognitive system instance operates, an identification of one or more sources of content associated with the corpus upon which the corresponding cognitive system instance operates, or specific content identifiers identifying specific documents or portions of content present in the corpus upon which the corresponding cognitive system instance operates.

3. The method of claim 1, wherein the operational characteristics of the corresponding cognitive system instance corresponding to the entry comprises at least one of features extracted from an input question by the corresponding cognitive system instance, at least one answer generated by the corresponding cognitive system instance in response to the input question, at least one confidence score associated with the at least one answer generated in response to the input question, or supporting evidence information for the at least one answer generated in response to the input question.

4. The method of claim 3, wherein the input question is a test input question submitted to each corresponding cognitive system instance of each entry in the cognitive system database.

5. The method of claim 1, wherein receiving a request to identify a potential collaborative cognitive system instance comprises receiving at least one selection criterion for selecting a candidate collaborative cognitive system instance from the entries in the cognitive system database.

6. The method of claim 5, wherein the at least one selection criterion comprises at least one comparison of an operational characteristic of a potential collaborative cognitive system instance to an operational characteristic of a requestor cognitive system instance associated with the requestor.

7. The method of claim 6, wherein the at least one selection criterion is automatically generated in response to the requestor selecting a portion of an ontology of the requestor cognitive system instance.

8. The method of claim 1, wherein the collaboration recommendation further comprises an indication of a predicted beneficial result should the candidate collaborative cognitive system instance be incorporated with the requestor cognitive system instance.

9. The method of claim 1, further comprising:
automatically performing, by the CSCIRS, one or more operations to initiate collaboration between the candidate cognitive system instance and a requestor cognitive system instance associated with the requestor in response to the collaboration recommendation indicating that collaboration should be performed.

10. A computer program product comprising a computer readable storage medium having a computer readable program stored therein, wherein the computer readable program, when executed on a computing device, causes the computing device to implement a cognitive system collaboration identification and recommendation system (CSCIRS) that operates to:
store, in a cognitive system database, entries corresponding to a plurality of cognitive system instances, wherein each entry identifies operational characteristics of a corresponding cognitive system instance;
receive, from a requestor, a request to identify a potential collaborative cognitive system instance;
identify, based on the request and the cognitive system database, a candidate collaborative cognitive system instance;
generate a collaboration recommendation based on the identification; and
output an output corresponding to the collaboration recommendation, wherein the collaboration recommendation comprises a recommendation as to whether or not the candidate collaborative cognitive system instance should be incorporated with a requestor cognitive system instance associated with the requestor based on an evaluation of similarities and differences between the candidate collaborative cognitive system instance and the requestor cognitive system instance.

11. The computer program product of claim 10, wherein the operational characteristics of the corresponding cognitive system instance corresponding to the entry comprises at least one of a type of content present in a corpus upon which the corresponding cognitive system instance operates, an identification of one or more sources of content associated with the corpus upon which the corresponding cognitive system instance operates, or specific content identifiers identifying specific documents or portions of content present in the corpus upon which the corresponding cognitive system instance operates.

12. The computer program product of claim 10, wherein the operational characteristics of the corresponding cognitive system instance corresponding to the entry comprises at least one of features extracted from an input question by the corresponding cognitive system instance, at least one answer generated by the corresponding cognitive system instance in response to the input question, at least one confidence score associated with the at least one answer generated in response to the input question, or supporting evidence information for the at least one answer generated in response to the input question.

13. The computer program product of claim 12, wherein the input question is a test input question submitted to each corresponding cognitive system instance of each entry in the cognitive system database.

14. The computer program product of claim 10, wherein receiving a request to identify a potential collaborative cognitive system instance comprises receiving at least one selection criterion for selecting a candidate collaborative cognitive system instance from the entries in the cognitive system database.

15. The computer program product of claim 14, wherein the at least one selection criterion comprises at least one comparison of an operational characteristic of a potential collaborative cognitive system instance to an operational characteristic of a requestor cognitive system instance associated with the requestor.

16. The computer program product of claim 15, wherein the at least one selection criterion is automatically generated in response to the requestor selecting a portion of an ontology of the requestor cognitive system instance.

17. The computer program product of claim 10, wherein the collaboration recommendation further comprises an indication of a predicted beneficial result should the candidate collaborative cognitive system instance be incorporated with the requestor cognitive system instance.

18. The computer program product of claim 10, wherein the CSCIRS further operates to:
automatically perform one or more operations to initiate collaboration between the candidate cognitive system instance and a requestor cognitive system instance associated with the requestor in response to the collaboration recommendation indicating that collaboration should be performed.

19. An apparatus comprising:

a processor; and a memory coupled to the processor, wherein the memory comprises instructions which, when executed by the processor, cause the processor to implement a cognitive system collaboration identification and recommendation system (CSCIRS) that operates to:

store, in a cognitive system database, entries corresponding to a plurality of cognitive system instances, wherein each entry identifies operational characteristics of a corresponding cognitive system instance;

receive, from a requestor, a request to identify a potential collaborative cognitive system instance;

identify, based on the request and the cognitive system database, a candidate collaborative cognitive system instance;

generate a collaboration recommendation based on the identification; and output an output corresponding to the collaboration recommendation, wherein the collaboration recommendation comprises a recommendation as to whether or not the candidate collaborative cognitive system instance should be incorporated with a requestor cognitive system instance associated with the requestor based on an evaluation of similarities and differences between the candidate collaborative cognitive system instance and the requestor cognitive system instance.

* * * * *